United States Patent [19]
Traver et al.

[11] Patent Number: 4,779,181
[45] Date of Patent: Oct. 18, 1988

[54] MULTIPHASE LOW HARMONIC DISTORTION TRANSFORMER

[75] Inventors: John H. Traver, La Habra; Chung-Hang Peng, Walnut; Mohammad A. Massoudi, Covina; Abraham A. Dauhajre, Altadena, all of Calif.

[73] Assignee: Almond Instruments Company, Inc., Covina, Calif.

[21] Appl. No.: 899,332

[22] Filed: Aug. 18, 1986

[51] Int. Cl.$^4$ .............................................. H02M 5/02
[52] U.S. Cl. ........................................ 363/154; 336/5; 363/3
[58] Field of Search ............................ 336/5; 363/3–7, 363/64, 153, 154; 323/361

[56] References Cited

U.S. PATENT DOCUMENTS

| | | | |
|---|---|---|---|
| 1,712,491 | 5/1929 | Darrieus | 363/3 |
| 1,932,272 | 10/1933 | Kaar | 363/64 |

FOREIGN PATENT DOCUMENTS

| | | | |
|---|---|---|---|
| 748728 | 7/1980 | U.S.S.R. | 363/5 |
| 858187 | 8/1981 | U.S.S.R. | 363/3 |
| 1035755 | 8/1983 | U.S.S.R. | 363/3 |
| 1181091 | 9/1986 | U.S.S.R. | 363/3 |

OTHER PUBLICATIONS

Reduction of Line Current Harmonics in 3-Phase Off--Line Rectifier Systems by Use of an Efficient 3-Phase to 9-Phase Autotransformer Conversion Technique, Michael L. Williams, Naval Sea Systems Command, Apr. 12, 1979.
System Level Reduction of Line Current Homonics Caused by Capacitor Input Rectifiers in 3-Phase Systems, Michael L. Williams, Dec. 15, 1981.
Three-Percent Harmonic Current Limit on Shipboard Power Systems: Requirements and Solutions", Navy Power Supply Reliability Design & Mfg. Guidelines, NAVMAT P4855-1*, *Dec. 1982, Appendix B.

*Primary Examiner*—William N. Beha, Jr.
*Attorney, Agent, or Firm*—Finnegan, Henderson, Farabow, Garrett & Dunner

[57] ABSTRACT

A multiphase transformer is provided for converting an input signal having N phases into an output signal having M phases. The transformer includes a plurality of first windings connected together to provide a load for an N phase signal, with each of the first windings having a plurality of take-off points, including tap-off points interior to the ends of the first windings. A mechanism is provided for coupling the input signal to the first windings. A plurality of M output terminals is further provided as is a mechanism for coupling the M output terminals to at least some of the take-off points of the first windings. This mechanism includes a plurality of second windings, with the second windings each electrically coupled between one of the output terminals and one of the tap-off points of the first windings and with each of the second windings magnetically coupled to another of the first windings. The location of the tap-off points coupled to the output terminals, the number of turns of the second windings, and the phase of the magnetic coupling resulting in a respective one of the M phases at each of the M output terminals.

19 Claims, 11 Drawing Sheets

MULTIPHASE LOW HARMONIC DISTORTION TRANSFORMER

FIELD OF THE INVENTION

This invention pertains to multiphase transformers for converting an input signal, preferably a power input signal, of N phases to an output signal of M phases, wherein N is an interger greater than two such as, for example, three and M is also an integer greater than two such as, for example, 9, 12, 15 or 21.

II. BACKGROUND INFORMATION

Large scale applications of electronics systems generally require direct current (DC) power provided by a rectifier system which rectifies three phase alternating current (AC) from an AC power source, such as an AC generator.

For a given AC input voltage, such a rectifier system must be able to provide a specific DC voltage output, while minimizing harmonics induced in the AC power source over a wide range of load currents. A rectifier system has numerous shipboard and aircraft applications, therefore such a system should be as small, lightweight, and efficient as possible to minimize space, weight, and ventilation requirements.

Excessive harmonic currents induced by rectifier systems produce numerous deleterious effects, particularly in shipboard applications. These effects may include significant electronic system performance degradation, electromagnetic interference, excessive shipboard hull currents, AC generator rotor overheating, and harmonic-induced torques in AC generators resulting in undesirable vibration modes and system specific "sound signatures."

Harmonic currents are the direct result of the process of rectifying AC power to produce DC power. These harmonic currents can be reduced by increasing the number of AC phases being rectified. Numerous methods exist for converting three phase ac input power into multiphase output power suitable for rectification. Most use multiphase transformers having three phase primary windings coupled to multiple wye or delta secondary windings. Where isolation is not required, autotransformers, as discussed by Michael L. Williams in "Reduction of Line Current Harmonics in 3-Phase Off-Line Rectifier Systems by Use of an Efficient 3-phase to 9-phase Auto-Transformer Conversion Technique," Naval Sea Systems Command, Apr. 12, 1979 have been used. These multiphase methods reduce the harmonic currents generated by the rectifier system, but require resistive and/or inductive tuning of the multiphase transformers to reduce harmonic currents to acceptable levels. This tuning reduces the transformer efficiency resulting in larger, heavier transformers and increased ventilation requirements. Moreover, autotransformers do not allow an output voltage to be specified for a given input voltage.

Accordingly, there exists a need for a multiphase transformer, and a method for designing a multiphase transformer that provides precisely controlled multiphase output resulting in low harmonic currents over a wide range of load currents without requiring resistive and inductive tuning when applied to a rectifier system, and that provides a specified output voltage for a given input voltage.

SUMMARY OF THE INVENTION

An object of the present invention is to provide an improved multiphase transformer.

More specifically, an object of the present invention is to provide a multiphase transformer which is capable of generating a controlled multiphase output which results in low harmonic currents over a wide range of load currents without requiring resistive or inductive tuning.

A still further object of the present invention is to provide a multiphase transformer which is capable of providing a specific output voltage for a given input voltage.

Additional objects and advantages of the invention will be set forth in the description which follows and, in part, will be obvious from that description or may be learned by practice of the invention;

To achieve the foregoing objects and in accordance with the purposes of the invention as embodied and broadly described herein, a multiphase transformer is provided for converting an input signal having N phases (where N is an integer greater than two) to an output signal having M phases (where M is an integer greater than two), comprising: (a) a plurality of first windings connected together to provide a load for an N phase signal, with each of the first windings having a plurality of take-off points including tap-off points interior to the ends of the first windings; (b) first means for coupling the input signal to the first windings; (c) a plurality of M output terminals; and (d) second means for coupling the M output terminals to at least some of the take-off points of the first windings, with the second means for coupling including a plurality of second windings, with the second windings each electrically coupled between one of the output terminals and one of the tap-off points of one of the first windings and with each of the second windings magnetically coupled to another of the first windings; the location of the take-off points coupled to the output terminals, the number of turns of the second windings and the phase of the magnetic coupling resulting in a respective one of the M phases at each of the M output terminals.

Preferably, additional windings are provided on the first windings in order to adjust a resultant rectified DC output signal as a function of the position and magnitude of those additional windings.

It is still further preferable that the location of the take-off points and number of turns of the second windings be defined by a phasor diagram including: a circle divided by M junctions into M segments, with the radial length of each of those segments representing the degree of phase shift at a respective one of the output terminals and the length of each chord between junctions representing the magnitude of the output signal at the output terminals represented by those junctions; a figure superimposed over the circle comprising a plurality of first vectors representing first windings; and a plurality of second vectors, one for each of the second windings, with the second vectors extending from one of the junctions of the circle parallel to one of the first vectors until intersection of either another of the first vectors or another of the second vectors; and with the location of each of those intersections defining the location of the take-off point of the corresponding first or second windings and the length of each of the second vectors representing the magnitude of the corresponding second winding.

BRIEF DESCRIPTION OF THE DRAWINGS

The accompanying drawings, which are incorporated in and constitute a part of the specification, illustrate a preferred embodiment of the invention and, together with the general description of the invention given above and a detailed description of the preferred embodiment given below serve to explain the principles of the invention.

DESCRIPTION OF THE PREFERRED EMBODIMENT

Reference will now be made in detail to the present preferred embodiment of the invention as illustrated in the accompanying drawings.

Figure 1:
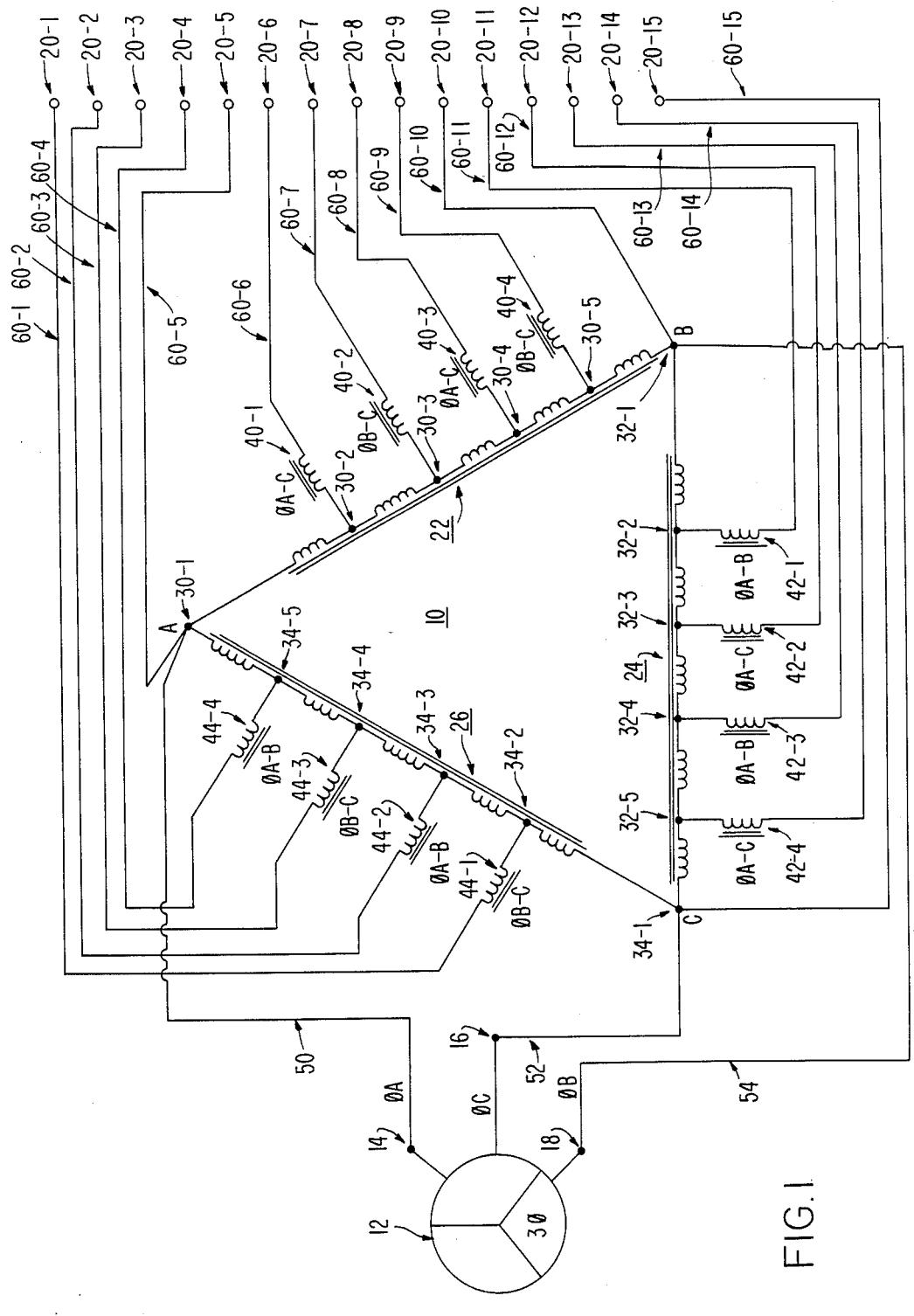
FIG. 1 is a schematic diagram of a multiphase transformer incorporating the teachings of the present invention.

FIG. 1 is a schematic diagram of a multiphase transformer incorporating the teachings of the present invention. Specifically in FIG. 1 there is illustrated a multiphase transformer 10 for converting an input signal having three phases into an output signal having fifteen phases. In FIG. 1 there is illustrated a source 12 for the three phase input signal having three output terminals 14, 16 and 18; fifteen output terminals 20-1 through 20-15 for transformer 10; first windings 22, 24 and 26; take-off points 30-1 through 30-5 for winding 22, 32-1 through 32-5 for winding 24, and 34-1 through 34-5 for winding 26 (with take-off point 30-1 common to both windings 22 and 26, take-off point 32-1 common to both windings 22 and 24, and take-off point 34-1 common to windings 24 and 26); and a plurality of second windings 40-1 through 40-4, 42-1 through 42-4, and 44-1 through 44-4.

First windings 22, 24 and 26 are connected together to provide a load for a three phase input signal from source 12. Preferably, source 12 is a power signal source and the resulting input signal for transformer 10 is a power input signal. As specifically illustrated in FIG. 1, windings 22 and 26 are connected together at a common junction point A, windings 22 and 24 are connected together at a common junction point B and windings 24 and 26 are connected together at a common junction point C. As noted above, each of windings 22, 24 and 26 have a plurality of take-off points, some of which are located interior to the ends of windings 22, 24 and 26. Such take-off points, namely, take-off points 30-2 through 30-5; 32-2 through 32-5; and 34-2 through 34-5 are referred to hereinafter as "tap-off points." Thus, tap-off points are a specific subset of take-off points and take-off points include points located at the ends of first windings 22, 24 and 26. Accordingly, points 30-1, 32-1 and 34-1 are take-off points of windings 22, 24 and 26, but are not tap-off points of those windings as that term is used herein.

As is further illustrated in FIG. 1, wires 50, 52 and 54 are shown connecting output terminals 14, 16 and 18 of three phase source 12 to common junction points A, C and B, respectively. Thus, wires 50, 52 and 54 provide an illustrative mechanism for coupling an input signal from three phase source 12 to first windings 22, 24 and 26.

Multiphase transformer 10 of FIG. 1 is a three phase to fifteen phase transformer. Thus, fifteen output terminals 20-1 through 20-15 are provided. As is further illustrated in FIG. 1, a plurality of wires 60-1 through 60-15 are provided which, along with secondary windings 40-1 through 40-4, 42-1 through 42-4, and 44-1 through 44-4, couple the fifteen output terminals 20-1 through 20-15 to take off points 30-1 through 30-5, 32-1 through 32-5, and 34-1 through 34-5. In the case of wires 60-1 through 60-4, 60-6 through 60-9, and 60-11 through 60-14, the connection to respective tap-off points 34-2 through 34-5, 30-2 through 30-5 and 32-2 through 32-5 is accomplished through a series connection with second windings 44-1 through 44-4, 40-1 through 40-4 and 42-1 through 42-4, respectively.

As is further illustrated in FIG. 1, second windings 42-1, 42-3, 44-2 and 44-4 are magnetically coupled to first winding 22; second windings 40-2, 40-4, 44-1 and 44-3 are magnetically coupled to first winding 24; and second windings 40-1, 40-3, 42-2 and 42-4 are magnetically coupled to first winding 26. These magnetic couplings are preferably accomplished through utilization of common magnetic cores as should be well understood by those skilled in the art.

As will be further described below in conjunction with FIG. 2, the location of take-off points 30-1 through 30-5, 32-1 through 32-5 and 34-1 through 34-5; the number of turns in second windings 40-1 through 40-4, 42-1 through 42-4 and 44-1 through 44-4; and the phase of the magnetic coupling between those second windings and first windings 22, 24 and 26 are arranged to result in a respective one of the fifteen phases appearing at each output terminal 20-1 through 20-15.

Figure 2:
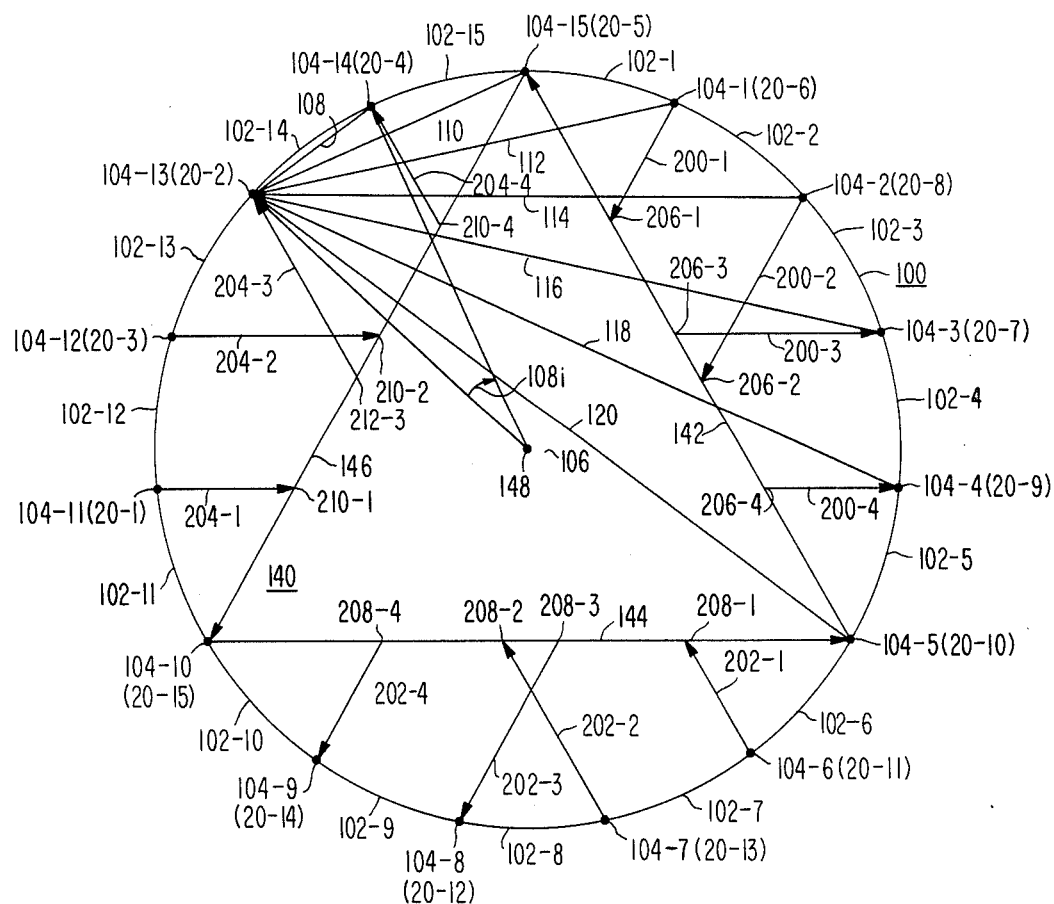
FIG. 2 is a phasor diagram further describing the embodiment of the present invention illustrated in FIG. 1.

FIG. 2 is a phasor diagram further describing the embodiment of the present invention illustrated in FIG. 1. The phasor diagram of FIG. 2 comprises a circle 100 whose circumference is divided into fifteen segments 102-1 through 102-15, with the junctions 104-1 through 104-15 of each of those segments representing a respective one of output terminals 20-1 through 20-15 of FIG. 1. Specifically, junction 104-1 corresponds to output terminal 20-6, junction 104-2 corresponds to output terminal 20-8, junction 104-3 corresponds to output terminal 20-7, junction 104-4 corresponds to output terminal 20-9, junction 104-5 corresponds to output terminal 20-10, junction 104-6 corresponds to output terminal 20-11, junction 104-7 corresponds to output terminal 20-13, junction 104-8 corresponds to output terminal 20-12, junction 104-9 corresponds to output terminal 20-14, junction 104-10 corresponds to output terminal 20-15, junction 104-11 corresponds to output terminal 20-1, junction 104-12 corresponds to output terminal 20-3, junction 104-13 corresponds to output terminal 20-2, junction 104-14 corresponds to input terminal 20-4, and junction 104-15 corresponds to output terminal 20-5. Circle 100 has a center 106 from which the radial length of each segment indicated by angle 108i represents the degree of phase shift at respective ones of output terminals 20-1 through 20-15 represented by the respective ends of junctions 104-1 through 104-15 of each segment 102-1 through 102-15. Thus, with fifteen equilength segments, angle 108i for each of those segments is 24°. Of course, it should be understood that, in accordance with the teachings of the present invention, there may be more or less segments than fifteen. Furthermore, although it is preferable that the segments of circle 100 each be of equal radial length, it is possible that these segments may each be of different radial length.

In the phasor diagram of FIG. 2 there are provided a plurality of chords 108, 110, 112, 114, 116, 118, 120 from a representative junction 104-13 to a plurality of adjacent junctions 104-14, 104-15, 104-1, 104-2, 104-3, 104-4 and 104-5, respectively. The length of each chord 108 through 120 between those junctions represents the magnitude of the output signal at the corresponding output terminals (20-4, 20-5, 20-6, 20-8, 20-7, 20-9 and 20-10, respectively) represented by those junctions.

The phasor diagram of FIG. 2 further comprises a FIG. 140 in the form of a triangle comprising a plurality of first vectors 142, 144 and 146. Each of first vectors 142, 144 and 146 represents first windings 22, 24 and 26, respectively. The length of first vectors 142, 144 and 146 represents the number of turns of respective first windings 22, 24 and 26, and the illustrated interconnection of first vectors 142, 144 and 146 represents the manner in which respective first windings 22, 24 and 26 are connected together. Thus, given a delta configuration of windings 22, 24 and 26 as shown in FIG. 1, first vectors 142, 144 and 146 of FIG. 2 are shown in a triangular configuration. However, if first winding 22, 24 and 26 of FIG. 1 were instead arranged in a wye configuration, first vectors 142, 144 and 146 of FIG. 2 would also be arranged in a corresponding wye configuration.

FIG. 140 of FIG. 2 has an effective neutral position 148 which is positioned congruent with the center 106 of circle 100. An effective electrical neutral position is in essence the position in a phasor diagram formed by the collection of first vectors which, at any time, has no effective magnitude or phase. Thus, for a balanced configuration, the effective electrical neutral position of the resultant vector figure would be the precise geometric center of that figure.

The phasor diagram of FIG. 2 further includes a plurality of second vectors 200-1 through 200-4; 202-1 through 202-4; and 204-1 through 204-4, one for each of second windings 40-1 through 40-4, 42-1 through 42-4; and 44-1 through 44-4. For reasons which are discussed in more detail below, second vector 200-2 corresponds to second winding 40-3 whereas second vector 200-3 corresponds to second winding 40-2; second vector 202-2 corresponds to second winding 42-3 whereas second vector 202-3 corresponds to second winding 42-2; and second vector 204-2 corresponds to second winding 44-3 whereas second vector 204-3 corresponds to second winding 44-2. The reason for this correspondence lies in the fact that second vectors 200-2 and 200-3, second vectors 202-2 and 202-3, and second vectors 204-2 and 204-3 cross one another prior to intersecting corresponding first vectors 142, 144 and 146.

As is further shown in FIG. 2, each of second vectors 200-1 through 200-4, 202-1 through 202-4; and 204-1 through 204-4 extend from one of junctions 104-1 through 104-15, parallel to one of first vectors 142, 144, 146, until intersection with another first vector 142, 144, 146 at intersections 206-1 through 206-4, 208-1 through 208-4, and 210-1 through 210-4, respectively. Specifically, second vectors 202-1, 202-2, 204-3 and 204-4 are parallel to first vector 142; second vectors 200-3, 200-4, 204-1 and 204-2 are parallel to first vector 144; and second vectors 200-1, 200-2, 202-3 and 202-4 are parallel to first vector 146. These parallel arrangements illustrate the preferred magnetic coupling between first and second vectors, with vectors parallel to each other being magnetically coupled to each other.

The location of each of intersections 206-1 through 206-4; 208-1 through 208-4; and 210-1 through 210-4 define the location of the take-off points of the corresponding first winding and the length of each second vector represents the number of turns of the corresponding second winding. Thus, the length of the segment of first vector 142 between junction 104-15 and intersection 206-1 defines the number of turns in first winding 22 of FIG. 1 between take-off points 30-1 and 30-2. Similarly, since, as was described above, second vector 200-3 corresponds to second winding 40-2 of FIG. 1, the distance between intersections 206-1 and 206-3 on first vector 142 corresponds to the number of turns in first winding 22 between take-off points 30-2 and 30-3.

In a like manner, the lengths between various intersections 206-1 through 206-4, 208-1 through 208-4 and 210-1 through 210-4 represent the number of turns of first windings 22, 24 and 26 between corresponding tap-off points of those windings.

In addition, the length of second vectors 200-1 through 200-4; 202-1 through 202-4; and 204-1 through 204-4 represents the number of turns in the corresponding second windings 40-1 through 40-4; 42-1 through 42-4; and 44-1 through 44-4. Given this information, the relative number of turns in first windings 22, 24 and 26 between each of take-off points 30-1 through 30-5, 32-1 through 32-5; and 34-1 through 34-5, and the relative number of turns in each of second vectors 40-1 through 40-4; 42-1 through 42-4; and 44-1 through 44-4 may be determined.

Figure 3:
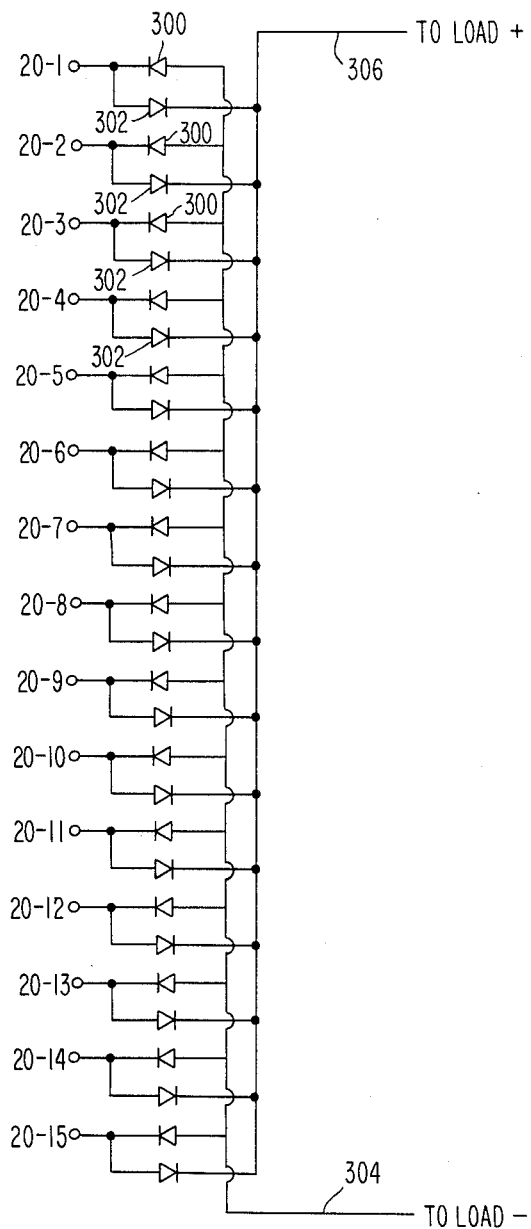
FIG. 3 is schematic diagram of a rectification circuit for use with the multiphase transformer illustrated in FIG. 1.

Preferably, the output of multiphase transformer 10 is rectified using a rectification circuit such as that illustrated in FIG. 3. Specifically, the rectification circuit of FIG. 3 comprises a plurality of first rectifiers 300 and a plurality of second rectifiers 302, each rectifier 300 is connected between a respective one of output terminals 20-1 through 20-15 and a negative load output bus 304, with the cathode of each diode 300 coupled to an output terminal and the anode connected to bus 304. Each of diodes 302 is also connected between an output terminal 20-1 through 20-15 and a positive output bus 306. The anode of each diode 302 is connected to an output terminal while the cathode is connected to bus 306.

Given the rectification circuit configuration of FIG. 3, the resultant rectified voltage between buses 304 and 306 has a magnitude proportional to the magnitude of each phase of the input signal supplied by source 12 in a ratio similar to the ratio of the length of the longest chord of FIG. 2, namely, chord 120 and the length of each of first vectors 142, 144, 146. Given the arrangement shown in FIG. 2, and assuming each phase of source 12 has a 115 volt RMS value, the resultant DC voltage between buses 306 and 304 will be on the order of 184 volts.

As is well known to those skilled in the art, in typical marine applications, a 155 DC volt supply or a 270 DC volt supply is required. Thus, in order to incorporate a multiphase transformer of the type illustrated in FIGS. 1 and 2 in a marine enviroment, it is necessary to provide some mechanism for converting the 184 volt DC output from the circuit of FIG. 3 to a 155 volt DC output or a 270 volt DC output. In this regard, a modification may be made to the circuits of FIGS. 2 and 3 to effectively and efficiently accomplish this result.

Specifically, in accordance with further teachings of the subject invention, additional windings may be employed in conjunction with the first windings of the subject invention in order to adjust the rectified DC output available to any desired level.

In FIG. 1 there is direct electrical connection between three phase source 12 of a three phase input signal and a respective three take-off points of first windings 22, 24 and 26, namely, take-off points 30-1, 34-1 and 32-1, respectively. Furthermore, in the embodiment of FIG. 1, each of take-off points 30-1, 4-1 and 32-1 are at precisely the same location as common junction points A, B, and C. Thus, in the phasor diagram of FIG. 2 junctions 104-15, 104-10 and 104-5 are directly connected to outputs 14, 18 and 16 of source 12, respectively and each of take-off points 104-15, 104-10 and 104-5 are located on first vectors 142, 146 and 144, respectively, while also being located on the circumference of circle 10. This arrangement results in the 184 volt DC output referred to above.

Figure 4:
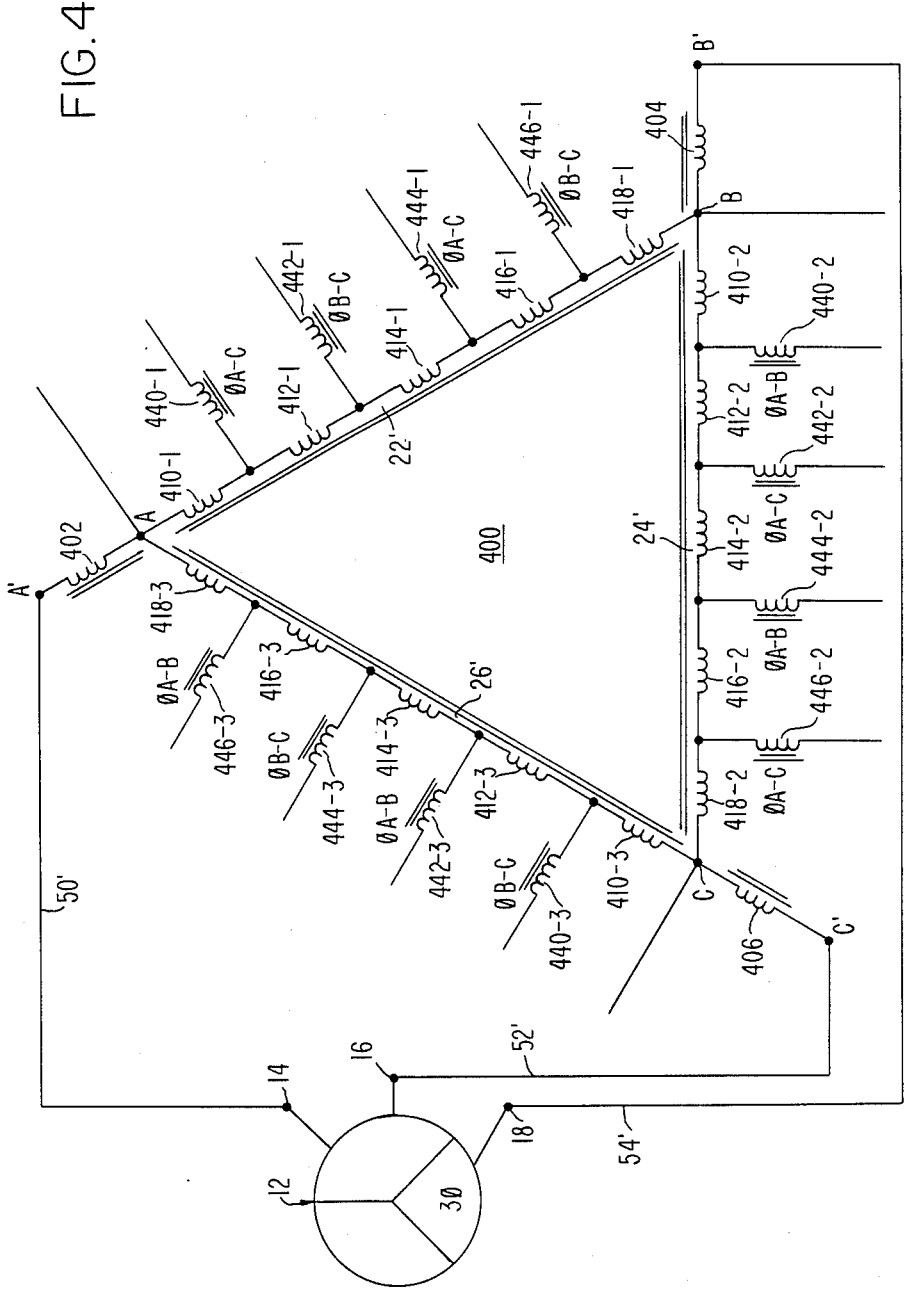
FIG. 4 is a circuit diagram of an alternative embodiment of an autotransformer incorporating still further teachings of the present invention and relating to the utilization of additional windings.

FIG. 4 is a circuit diagram of an alternative multiphase transformer 400 wherein first, second and third first windings 22', 24' and 26' include additional windings 402, 404 and 406 connected between additional take-off points A', B' and C' and respective common junction points A, B and C. Respective take-off points A', B' and C' are coupled directly to output terminals 14, 18 and 16 of source 12 by wires 50', 54' and 52' as illustrated in FIG. 4. In all other respects, multiphase transformer 400 of FIG. 4 is identical to the multiphase transformer 10 of FIG. 1.

Figure 5:
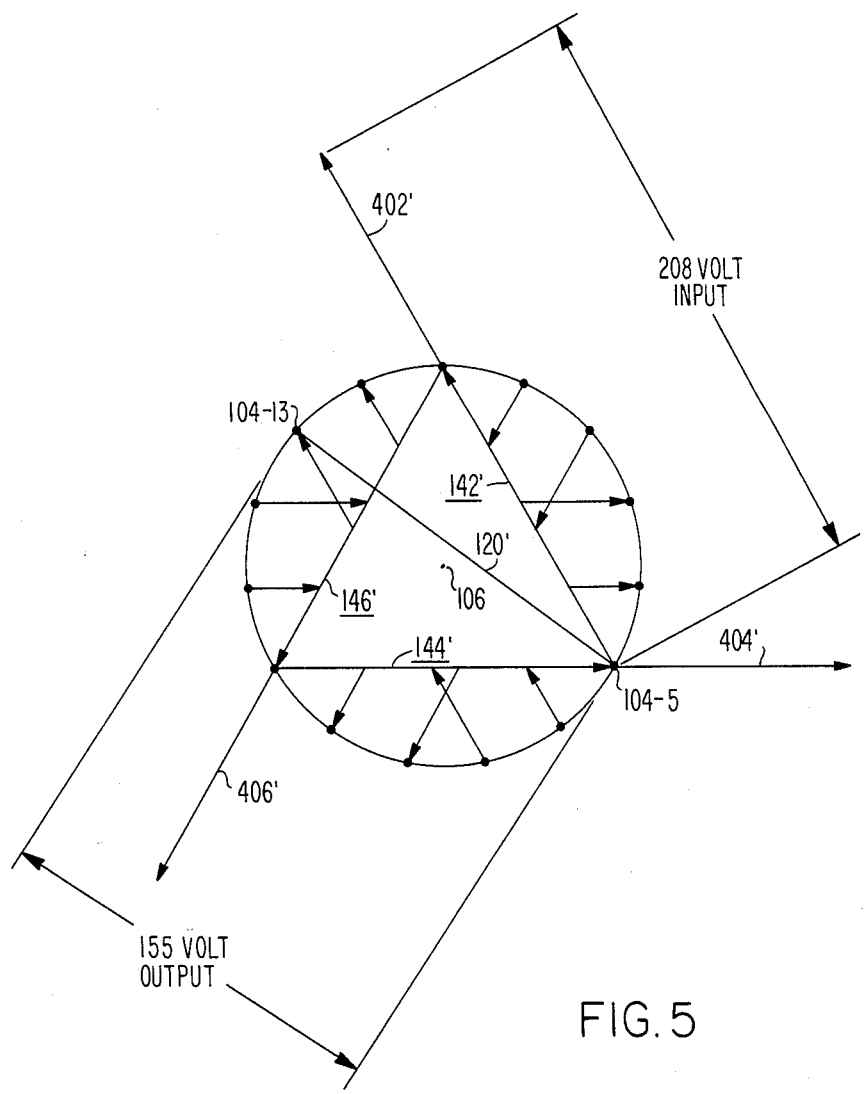
FIG. 5 is a phasor diagram of the embodiment of the subject invention illustrated in FIG. 4.

FIG. 5 is a phasor diagram of the embodiment of the subject invention illustrated in FIG. 4. Additional windings 402, 404 and 406 are illustrated in the diagram of FIG. 4 by extensions 402', 404' and 406' in FIG. 5, with the length of each extension 402', 404', 406' representing the number of turns in corresponding additional windings 402, 404 and 406, respectively. The employment of extensions 402', 404' and 406' results in extended first vectors 142', 144' and 146'. The resultant length of first vectors 142', 144' and 146' may thus be selected in a manner whereby the ratio of the length of those first vectors to the length of the longest chord between junctions (for example, between junctions 104-13 and 104-5 in FIG. 5) will result in an AC input to DC output ratio such that, for a 208 volt AC input, the resultant rectified DC output across buses 304 and 306 of FIG. 3 will be on the order of 155 volts.

By changing the length of first vectors 142', 144' and 146' in the phasor diagram of FIG. 5, and thereby changing the relative turns in corresponding additional windings 402', 404', and 406', the ratio between the AC input supplied to corresponding first windings 22', 24' and 26' of FIG. 4 to the DC output (represented by the length of maximum chord 120') may be readily adjusted to result in the desired DC rectified output, given a particular AC input.

In the embodiment of the subject invention illustrated in FIGS. 4 and 5, the length of first vectors 142', 144', 146' was extended through the utilization of additional winding 402', 404' and 406', thus reducing the resultant DC rectified output. However, it is also possible to reduce the effective length of vectors 142', 144' and 146' through the utilization of additional windings and thereby increase the magnitude of the resultant rectified DC output.

Figure 6:
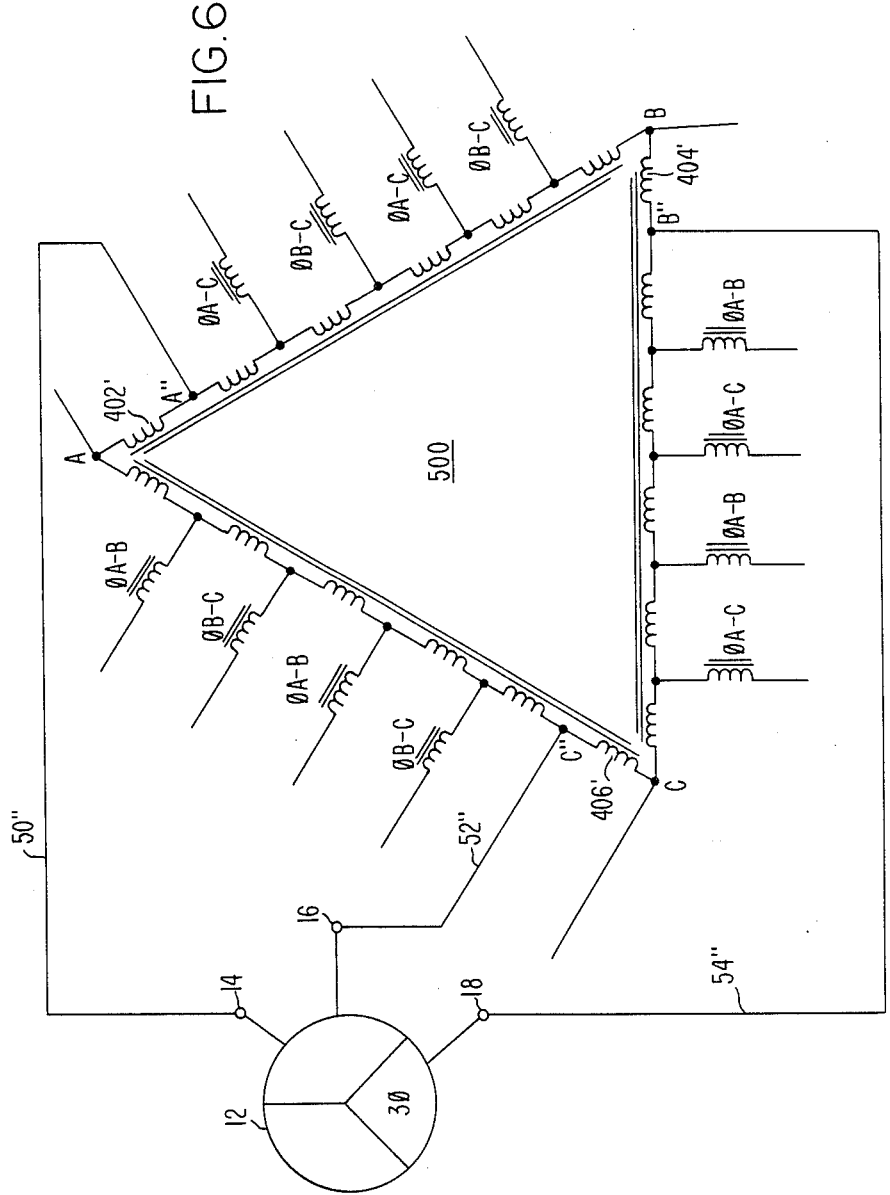
FIG. 6 illustrates a circuit diagram incorporating still further teachings of the subject invention relating to the utilization of additional windings.
Figure 7:
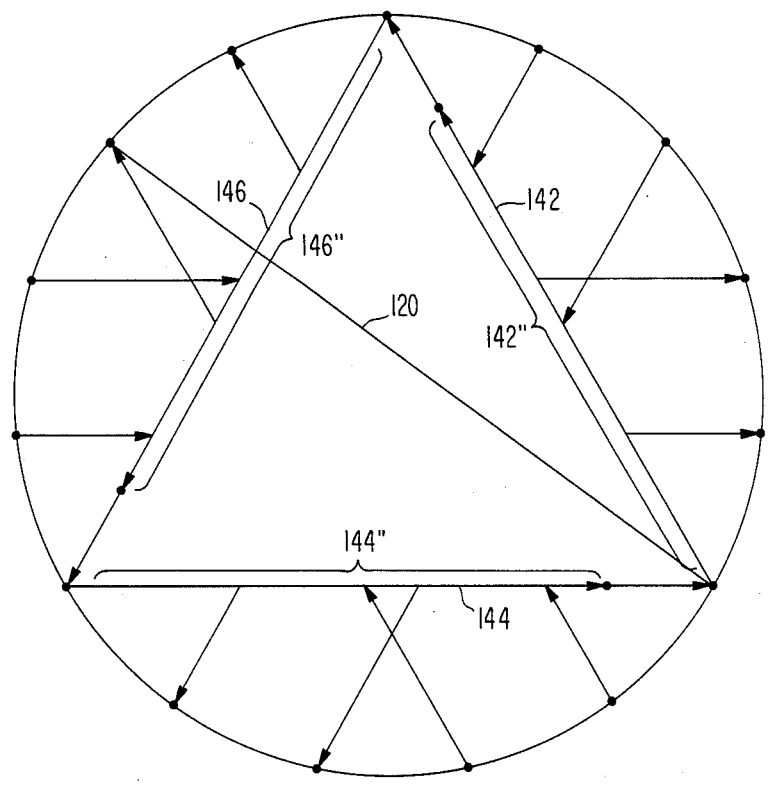
FIG. 7 is a phasor diagram of the embodiment of the subject invention illustrated in FIG. 6.

Specifically, FIG. 6 illustrates a circuit diagram incorporating still further teachings of the subject invention relating to the utilization of additional windings. In FIG. 6, additional windings 402', 404' and 406' of a transformer 500 are connected between common junction points A, B and C and additional internally located take-off points A", B" and C", respectively. Wires 50", 54" and 52" couple output terminals 14, 16 and 18 of source 12 to new take-out points A", B" and C", respectively. In all other aspects multiphase transformer 500 of FIG. 6 is identical to transformer 10 of FIG. 1. By placing additional windings 402', 404' and 406' internal to common junction points A, B and C, the resultant effective length of corresponding first vectors 142, 144 and 146 is reduced to the length illustrated by vectors 142", 144" and 146" in the phasor diagram of FIG. 7.

Thus, the ratio between the longest chord 120 and lengths 142", 144" and 146" is increased, thereby increasing the magnitude of the resultant DC rectified signal which may be obtained across buses 304 and 306 of FIG. 3.

The following preferred turns and wire sizes for the circuit of FIG. 4 provide a 155 volt DC 500 watts output, given an AC 208 volt RMS input, with less than about 3 percent harmonic distortion:

| Winding | Wire Size | Number of Turns |
|---|---|---|
| 402,404,406 | 18 AWG | 167 |
| 410-1, 410-2, 410-3 | 20 AWG | 65 |
| 412-1, 412-2, 412-3 | 20 AWG | 48 |
| 414-1, 414-2, 414-3 | 20 AWG | 19 |
| 416-1, 416-2, 416-3 | 20 AWG | 48 |
| 418-1, 418-2, 418-3 | 20 AWG | 65 |
| 440-1, 440-2, 440-3 | 21 AWG | 51 |
| 442-1, 442-2, 442-3 | 21 AWG | 78 |
| 444-1, 444-2, 444-3 | 21 AWG | 78 |
| 446-1, 446-2, 446-3 | 21 AWG | 51 |

Figure 8:
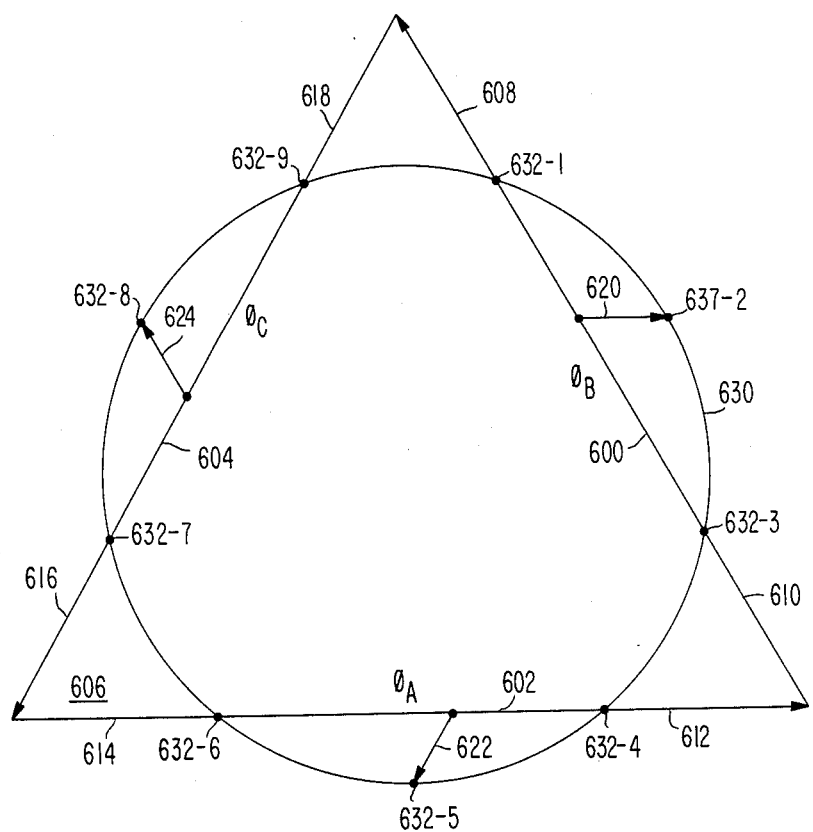
FIG. 8 is a phasor diagram of a three phase to nine phase multiphase transformer incorporating the teachings of the subject invention.

From the foregoing description of the preferred embodiment of the invention and variations thereof pertaining specifically to a three phase to fifteen phase multiphase transformer, it should be apparent to one skilled in the art that the principles of the invention disclosed in connection with these specific embodiments are applicable to an N by M multiphase transformer for converting an input signal having N phases, where N is an integer greater than two to an output signal having M phases, where M is an integer greater than two. For example, the phasor diagram of FIG. 8 represents the teachings of the present invention as applied to a three phase to nine phase multiphase transformer. In FIG. 8 first vectors 600, 602 and 604 are interconnected to result in a FIG. 606 of triangular form which represents a delta interconnection of corresponding first windings. First vector 600 includes extensions 608 and 610, while first vector 602 includes extensions 612 and 614, and first vector 604 includes extensions 616 and 618. Each of extensions 608, 610, 612, 614, 616 and 618 represents corresponding additional windings in the corresponding multiphase transformer represented by the phasor diagram of FIG. 8. Second vectors 620, 622 and 624 represent corresponding second windings of the transformer represented in FIG. 8, with the second winding corresponding to second vector 620 magnetically coupled to the first winding corresponding to first vector 602; the second winding corresponding to second vector 622 magnetically coupled to the first winding corresponding to first vector 604; and the second winding corresponding to second vector 624 magnetically coupled to the first winding corresponding to first vector 600. These arrangements are represented in FIG. 8 by the fact that vector 620 is parallel to vector 602; vector 622 is parallel to vector 604; and vector 624 is parallel to vector 600.

Circle 630 of FIG. 8 includes junctions 632-1 through 632-9 indicating that the transformer represented by the diagram of FIG. 8 is a three phase to nine phase multiphase transformer.

In accordance with still further teachings of the subject invention, it is not necessary that each second vector of a phasor diagram employing the teachings of the subject invention intersect a first vector. Instead, under some circumstances, it is preferable that certain second vectors intersect other second vectors. One preferred embodiment of this alternative teaching of the subject invention is illustated by the vector diagram of FIG. 9 The phasor diagram of FIG. 9 includes a circle 700; a plurality of first vectors 702, 704 and 706; a plrrality of second vectors 708-1 through 708-3, 710-1 through 710-3, 712-1 through 712-3, 714-1 through 714-3, 716-1 through 716-3 and 718-1 through 718-3; a plurality of take-off points 720-1 through 720-3, 722-1 through 722-3, 724-1 through 724-3, 726-1 through 726-3 and 728-1 through 728-3 on first vectors 702, 704 and 706, respectively; a plurality of take-off points 730-1 through 730-3 and 732-1 through 732-3 on second vectors 710-1 through 710-3 and second vectors 716-1 through 716-3, respectively; and junctions 740-1 through 740-21 along equidistant segments of the circumference of circle 700. Thus, the phasor diagram of FIG. 9 represents a three phase to twenty-one phase transformer built in accordance with the teachings of the subject invention.

Figure 9:
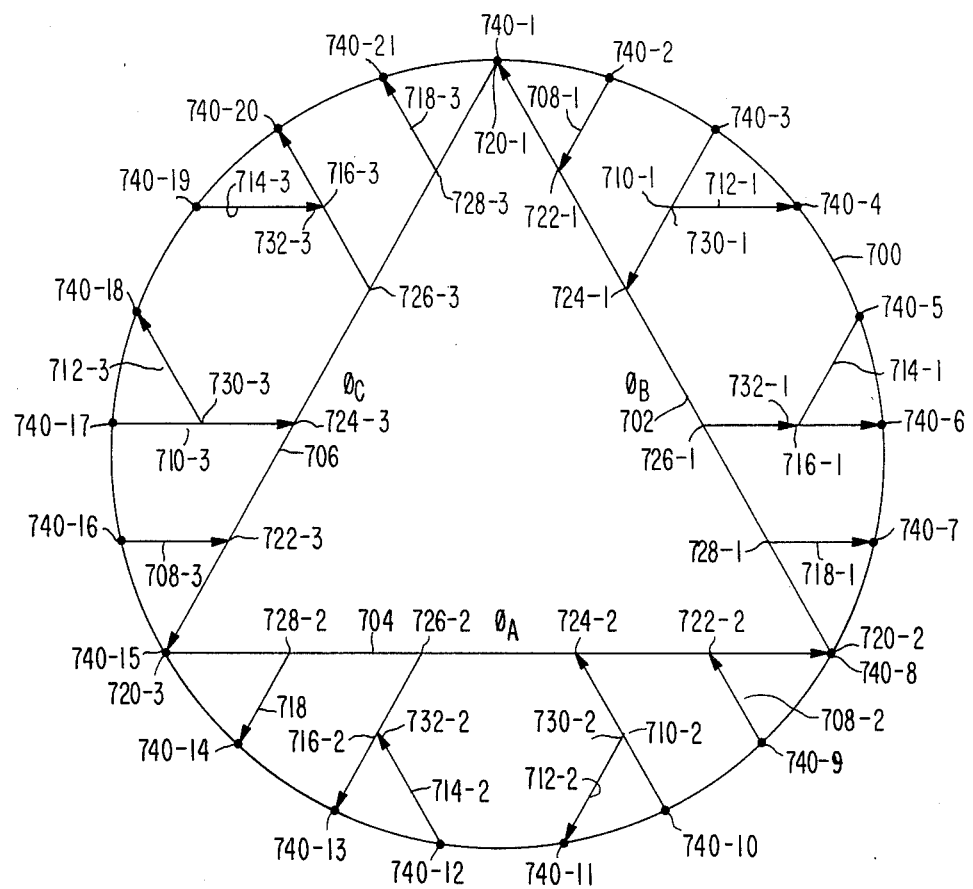
FIG. 9 is a phasor diagram of still a further embodiment of the subject invention.

However, although second vectors 712-1 through 712-3 and 714-1 through 714-3 may extend to intersect respective first vectors 702, 704 and 706, in the alternative, as illustrated in FIG. 9, second vectors 712-1 through 712-3 and second vectors 714-1 through 714-3 may, instead, terminate at the intersection of those vectors and corresponding second vectors 710-1 through 710-3 and 716-1 through 716-3 at take-off points 730-1 through 730-3 and 732-1 through 732-3 of second vectors 710-1 through 710-3 and second vectors 716-1 through 716-3, respectively. Thus, the second windings corresponding to second vectors 712-1 through 712-3 and the second windings corresponding to second vectors 714-1 through 714-3 may be substantially shorter using the teachings of the embodiment of FIG. 9 as opposed to the teachings of earlier disclosed embodiments. In all other respects, the transformer represented by FIG. 9 corresponds to the earlier described transformers.

Figure 10:
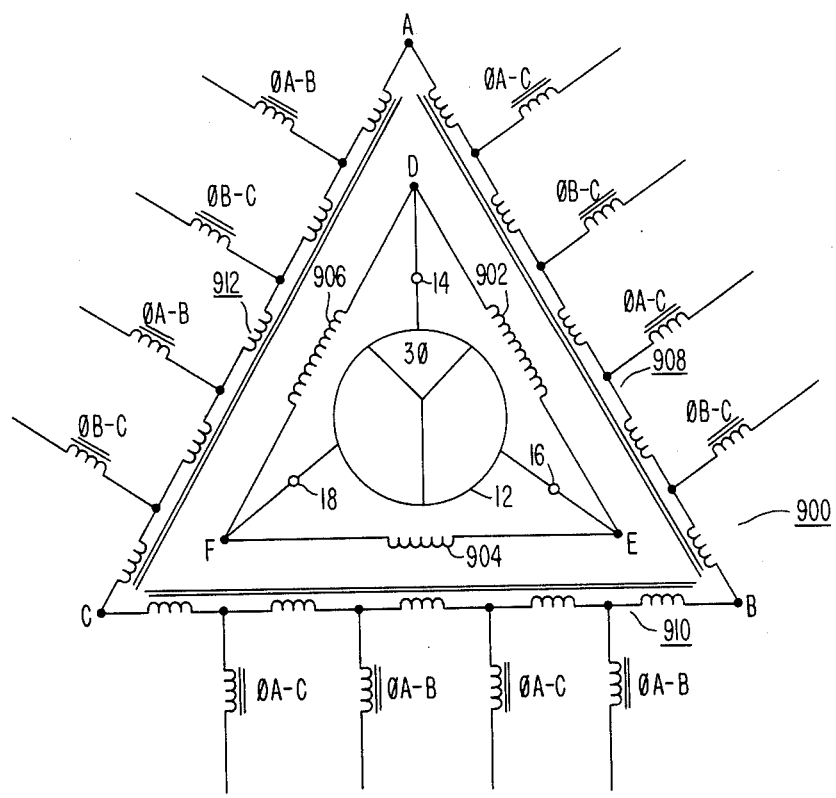
FIG. 10 is a circuit diagram of a still further embodiment of a multiphase transformer incorporating the teachings of the subject invention.

FIG. 10 is a circuit diagram of a still further embodiment of a multiphase transformer incorporating the teachings of the subject invention. Specifically, FIG. 10 is a circuit diagram of multiphase transformer 900. Unlike previous embodiments disclosed above wherein a direct electrical connection was provided between a multiphase source of an input signal and respective take-off points on the first windings of the multiphase transformer, in transformer 900 a mechanism is provided for coupling an input signal to the first windings which includes a plurality of primary windings 902, 904 and 906 that are connected together to receive and form a load for the input signal.

Specifically, as shown in FIG. 10, primary windings 902, 904 and 906 are illustratively connected in a delta configuration at common junction points D, E and F, with junction points D, E and F connected to respective output terminals 14, 16 and 18 of three phase source 12. In addition, as illustrated in FIG. 10, primary winding 902 is magnetically coupled to first winding 908, primary winding 904 is magnetically coupled to first winding 910, and primary winding 906 is magnetically coupled to first winding 912 to magnetically couple the three phase signal from source 12 to first windings 908, 910 and 912. Of course, instead of a delta configuration, primary windings 902, 904 and 906 may be connected in a conventional alternative arrangement such as a wye configuration.

Figure 11:
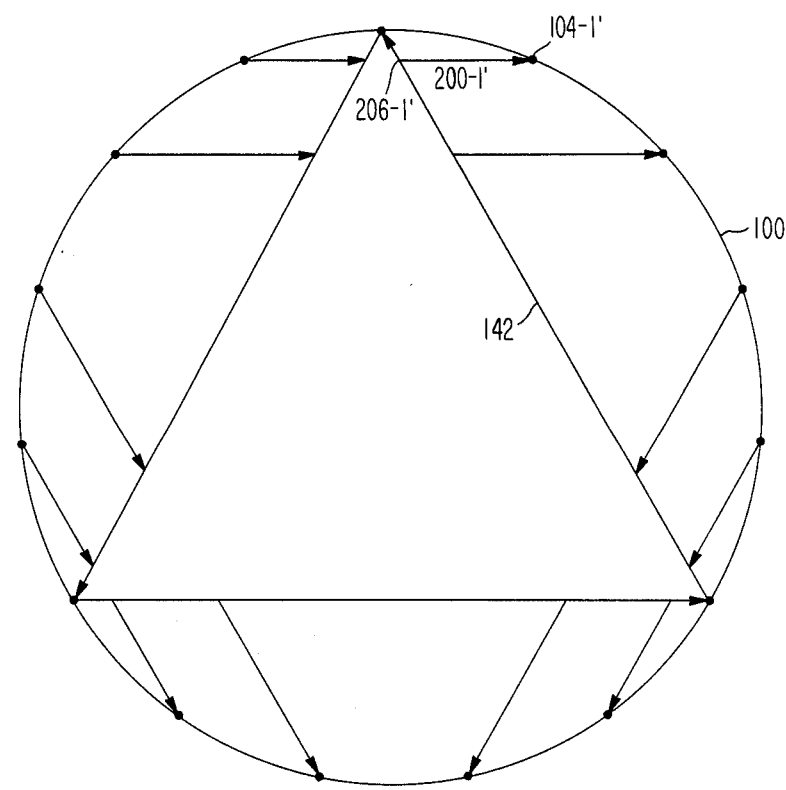
FIG. 11 is a phasor diagram of still a further embodiment of the subject invention which comprises a modification of the embodiment illustrated in connection with the phasor diagram of FIG. 2.

Still further, it should be understood that each of the second vectors illustrated in the above described phasor diagrams is arranged parallel to a first vector other than the first vector to which that second vector is connected. Thus, as is for example illustrated in the phasor diagram of FIG. 2 by second vector 200-1, a second vector 200-1 extends from a junction 104-1 in a direction parallel to a first vector 146. In the alternative, vector 200-1 may extend from junction 104-1 in a direction parallel to first vector 144. This arrangement is illustrated by vector 200-1' of the phasor diagram of FIG. 11. However, it should be noted that second vector 200-1 of FIG. 2 is arranged substantially more normal to circle 100 at junction 104-1 than vector 200-1' of FIG. 11. As presently understood, it is preferred that second vectors be selected to be as normal as possible to circle 100 at the junction of that second vector with that circle. With the most normal as possible arrangement, slight variations in the position of a take-off point 206-1 will result in only minor variations in the effective location of junction 104-1 whereas a similar magnitude variation in the position of take-off point 206-1' in the phasor diagram of FIG. 11 will result in a substantially greater deviation in the location of corresponding junction 104-1'.

Additional advantages and modifications will readily occur to those skilled in the art. Thus, the invention in its broader aspects is not limited to the specific details, representative apparatus and illustrative examples shown and described. Accordingly, departures may be made from such details without departing from the spirit or scope of applicants' generic inventive concept.

We claim:

1. A multiphase transformer for converting an input signal having N phases (where N is an integer greater than two) to an output signal having M phases (where M is an integer greater than two), comprising:

(a) a plurality of first windings connected together to provide a load for an N phase signal, with each of said first windings having a plurality of take-off points including tap-off points interior to the ends of said first windings;

(b) first means for coupling said input signal to said first windings;

(c) a plurality of M output terminals; and (d) second means for coupling said M output terminals to at least some of said take-off points of said first windings, said second means for coupling including a plurality of second windings with said second windings each electrically coupled between one of said output terminals and one of said tap-off points of one of said first windings and each of said second windings magnetically coupled to another of said first windings, with the location of said take-off points coupled to said output terminals, the number of turns of said second windings and the phase of said magnetic coupling resulting in a respective one of said M phases at each of said M output terminals; said take-off points having locations and said second windings having a number of turns defined by a phasor diagram which includes:

i. a circle whose circumference is divided into M segments with the junction of each of said segments representing a respective one of said output terminals, with the radial length of each of said segments representing the degree of phase shift at respective ones of said output terminals represented at the respective ends of that segment, and with the length of each chord between junctions representing the magnitude of the output signal at the output terminals represented by those junctions;

ii. a figure superimposed over said circle comprising a plurality of first phasors, one for each of said first windings, witht he length of said first phasor representing the number of turns of the respective first windings, and with the interconnection of the first phasors representing the manner in which said first windings are connected together, said figure having an effective electrical neutral position congruent with center of said circle; and iii. second phasors, one for each of said second windings, each of said second phasors extending from one of said juctions parallel to one of said first phasors until intersection of either another of said first phasors or another of said second vectors, with the location of each of said intersections defining the location of said take-off points on the corresponding first winding and with the length of said each second phasor representing the magnitude of said corresponding second winding.

2. A multiphase transformer of claim 1 wherein N equals three, M is greater than 8 and wherein said first windings are connected together to provide a load for a three phase signal.

3. A multiphase transformer of claim 1 where M is odd and M is an integer multiple of N.

4. A multiphase transformer of claim 1 or 2 wherein said first means for coupling includes primary windings which are connected together to receive and form a load for said input signal and which are magnetically coupled to said first windings to magnetically couple said input signal to said first windings.

5. A multiphase transformer of claim 1 or 2 wherein said first means for coupling includes a direct electrical connection between an N-phase source of said input signal and respective N of said take-off points on said first windings.

6. A multiphase transformer of claim 1 or 2 wherein N of said first windings are coupled together in a closed configuration at N common junction points.

7. A multiphase transformer of claim 6 wherein said first means for coupling includes a direct electrical connection between an N phase source of said input signal and a respective N of said take-off points on said first windings.

8. A multiphase transformer of claim 7 wherein said respective N of said take-off points on said first windings are at the same location as said N common junction points.

9. A multiphase transformer of claim 7 wherein said respective N of said take-off points lie on said first windings inside said N common junction points.

10. A multiphase transformer of claim 7 wherein said respective N of said take-off points lie on said first windings outside said N common junction points.

11. A multiphase transformer of claim 1 wherein said second means for coupling includes means for connecting each of said M output terminals to a respective one of said take-off points of said first windings.

12. A multiphase transformer of claim 1 wherein the orientation of each of said second phasors is selected to be as normal as possible to said circle at the junction of that second phasor with said circle.

13. A multiphase transformer of claim 1 wherein said first means for coupling includes a direct electrical connection between an N phase source of said input signal and respective N of said take-off points of said first windings.

14. A multiphase transformer of claim 1 wherein said respective N of said take-off points are located on said first phasors and are also located on the circumference of said circle.

15. A multiphase transformer of claim 1 wherein said respective N of said take-off points are located on said first phasors and are also located inside the circumference of said circle.

16. A multiphase transformer of claim 1 wherein said respective N of said take-off points are located on said first phasors and are also located outside the circumference of said circle.

17. A multiphase transformer for converting an input signal having N phases (where N is an integer greater than two) to an output signal having M phases (where M is an integer greater than two), comprising:

(a) a plurality of first windings connected together to provide a load for an N phase signal, with each of said first windings having a plurality of take-off points including tap-off points interior to the ends of said first windings;

(b) first means for coupling said input signal to said first windings;

(c) a plurality of M output terminals; and (d) second means for coupling K of said M output terminals, where K is an integer greater than one and less than or equal to M, in groups of at least two of said M output terminals to at least one of said tap-off points of said first windings, and coupling each to maining $M-K-N$ of said output terminals to a remaining one of said tap-off points, said second means for coupling including a plurality of second windings with said second windings each electrically coupled between one of said output terminals and one of said tap-off points of one of said first windings and each of said second windings magnetically coupled to another of said first windings, with the location of said tap-off points coupled to said output terminals, the number of turns of said second windings and the phase of said magnetic coupling resulting in a respective one of said M phases at each of said M output terminals.

18. A multiphase transformer of claim 17 wherein at least some of said second windings are electrically connected to said tap-off points of said first windings for each of said groups through connection to a take-off point of another second winding.

19. A multiphase transformer for converting an input signal having N phases to (where N is an integer greater than two) to an output signal having M phases, (where M is an integer greater than two), comprising:
(a) a plurality of first windings connected together to provide a load for an N phase signal, with each of said first windings having a plurality of take-off points including tap-off points interior to the ends of said first windings;
(b) first means for coupling said input signal to said first windings;
(c) a plurality of M output terminals; and
(d) second means for coupling said M output terminals to said tap-off points of said first windings, said second means for coupling including first and second groups of second windings, with each of said second windings in said first group electrically coupled between one of said M output terminals and one of said tap-off points of one of said first windings, and each of said second windings of said second group coupled between one of said M output terminals and a tap-off point on a respective one of said second windings in said first group, and each of said second windings magnetically coupled to one of said first windings, with the location of said tap-off points coupled to said output terminals, the number of turns of said second windings and the phase of said magnetic coupling resulting in a respective one of said M phases at each of said M output terminals; said tap-off points having locations and said second windings having a number of turns defined by a phasor diagram which includes:

i. a circle whose circumference is divided into M segments with the junction of each of said segments representing a respective one of said output terminals, with the radial length of each of said segments representing the degree of phase shift at respective ones of said output terminals represented at the respective ends of that segment, and with the length of each chord between junctions representing the magnitude of the output signal at the output terminals represented by those junctions;

ii. a figure superimposed over said circle comprising a plurality of first phasors, one for each of said first windings, with the length of said first phasor representing the number of turns of the respective first windings, and with the interconnection of the first phasors repersenting the manner in which said first windings are connected together, said figure having an effective electrical neutral position congruent with the center of said circle; and iii. second phasors, one for each of said second windings, each of said second phasors extending form one of said junctions parallel to one of said first phasors until intersection of either another of said first phasors or another of said second phasors, with the location of each of said intersections defining the location of the take-off point on the corresponding first or second winding and with the length of said each second phasors representing the magnitude of said corresponding second winding.

* * * * *